US011311096B2

(12) United States Patent
Wagner

(10) Patent No.: US 11,311,096 B2
(45) Date of Patent: Apr. 26, 2022

(54) BRUSH HEAD FOR AN ORAL CLEANSING DEVICE

(71) Applicant: WATER PIK, INC., Fort Collins, CO (US)

(72) Inventor: Robert D. Wagner, Firestone, CO (US)

(73) Assignee: WATER PIK, INC., Fort Collins, CO (US)

( * ) Notice: Subject to any disclaimer, the term of this patent is extended or adjusted under 35 U.S.C. 154(b) by 241 days.

(21) Appl. No.: 16/822,935

(22) Filed: Mar. 18, 2020

(65) Prior Publication Data

US 2021/0289930 A1 Sep. 23, 2021

(51) Int. Cl.
| | | |
|---|---|---|
| A46B 5/00 | (2006.01) |
| A46B 9/04 | (2006.01) |
| A46B 13/02 | (2006.01) |
| A61C 17/34 | (2006.01) |

(52) U.S. Cl.
CPC ............. *A46B 5/0095* (2013.01); *A46B 9/04* (2013.01); *A46B 13/02* (2013.01); *A61C 17/3418* (2013.01)

(58) Field of Classification Search
CPC ......... A46B 5/0095; A46B 9/04; A46B 13/02; A61C 17/34; A61C 17/3418; A61C 17/222; A61C 17/225
See application file for complete search history.

(56) References Cited

U.S. PATENT DOCUMENTS

| | | | | |
|---|---|---|---|---|
| 9,204,948 B2 * | 12/2015 | Kloster | ............... | A61C 17/222 |
| 9,724,180 B1 * | 8/2017 | Liu | ....... | A61C 17/222 |
| 2004/0010872 A1 * | 1/2004 | Chiang | .................. | A61C 17/34 |
| | | | | 15/28 |
| 2010/0043156 A1 * | 2/2010 | Kressner | .............. | A61C 17/222 |
| | | | | 15/22.1 |
| 2010/0251493 A1 | 10/2010 | Sale et al. | | |
| 2011/0107536 A1 * | 5/2011 | Dabrowski | ........ | A61C 17/3418 |
| | | | | 15/167.1 |
| 2012/0198635 A1 * | 8/2012 | Hilscher | ................ | A61B 18/00 |
| | | | | 15/22.1 |
| 2014/0150190 A1 | 6/2014 | Fattori | | |
| 2014/0341636 A1 * | 11/2014 | Fattori | ................. | A61C 17/222 |
| | | | | 403/14 |
| 2015/0082560 A1 * | 3/2015 | Graeve | ................ | A46B 5/0095 |
| | | | | 15/22.1 |
| 2015/0150663 A1 * | 6/2015 | Kressner | .............. | A61C 17/225 |
| | | | | 15/22.1 |
| 2015/0209125 A1 * | 7/2015 | Fattori | ................. | A61C 17/222 |
| | | | | 15/22.1 |
| 2019/0174905 A1 * | 6/2019 | Bloch | .................. | A46B 5/0095 |

FOREIGN PATENT DOCUMENTS

DE 102005041459 3/2007

* cited by examiner

*Primary Examiner* — Weilun Lo
(74) *Attorney, Agent, or Firm* — Dorsey & Whitney LLP

(57) ABSTRACT

A brush head for an oral cleansing device is provided. The brush head may include a shaft and a cantilevered beam positioned within the shaft. The cantilevered beam may be configured to press against a drive shaft of the oral cleansing device to transfer motion of the drive shaft to the brush head. The cantilevered beam may be formed on an adapter secured within the shaft.

20 Claims, 9 Drawing Sheets

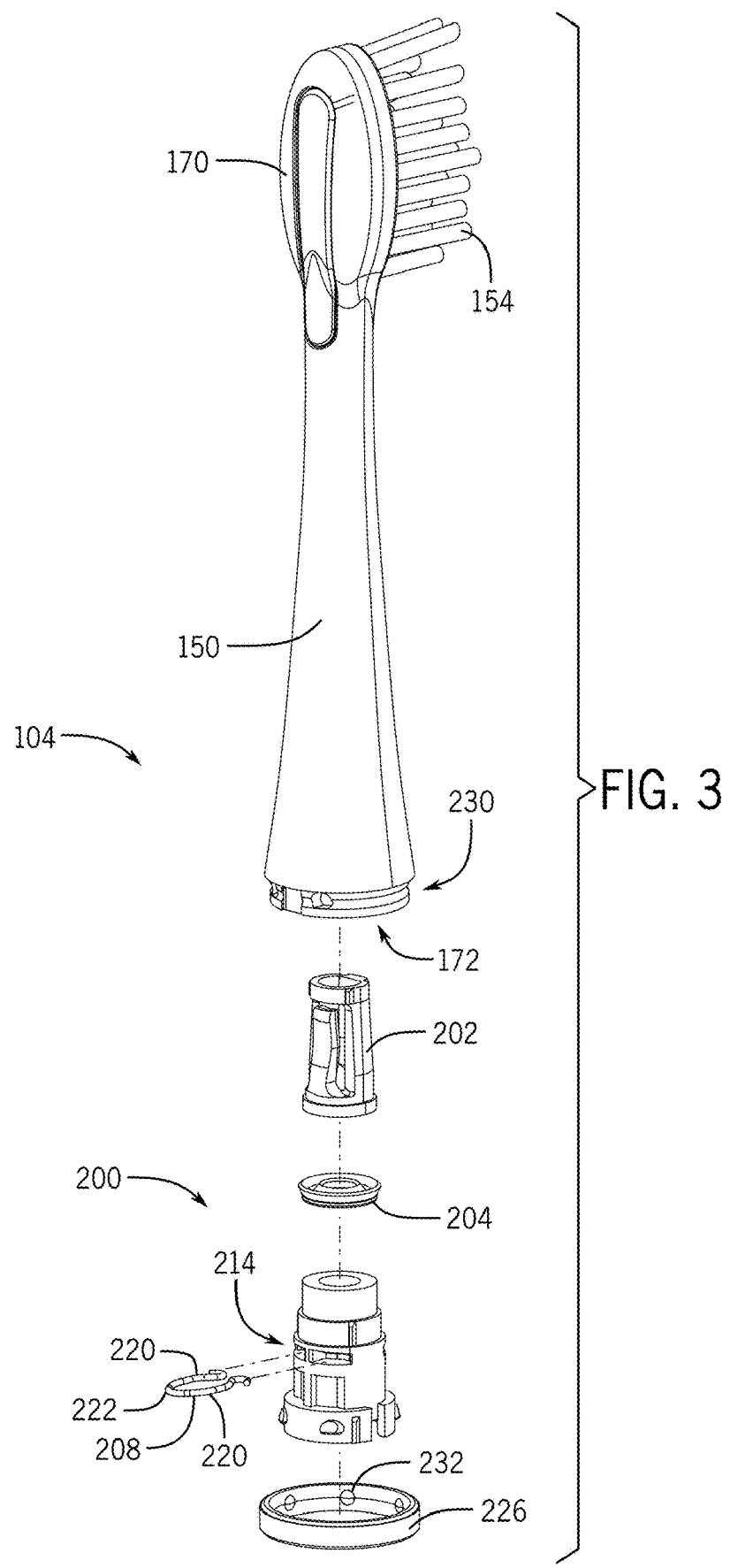

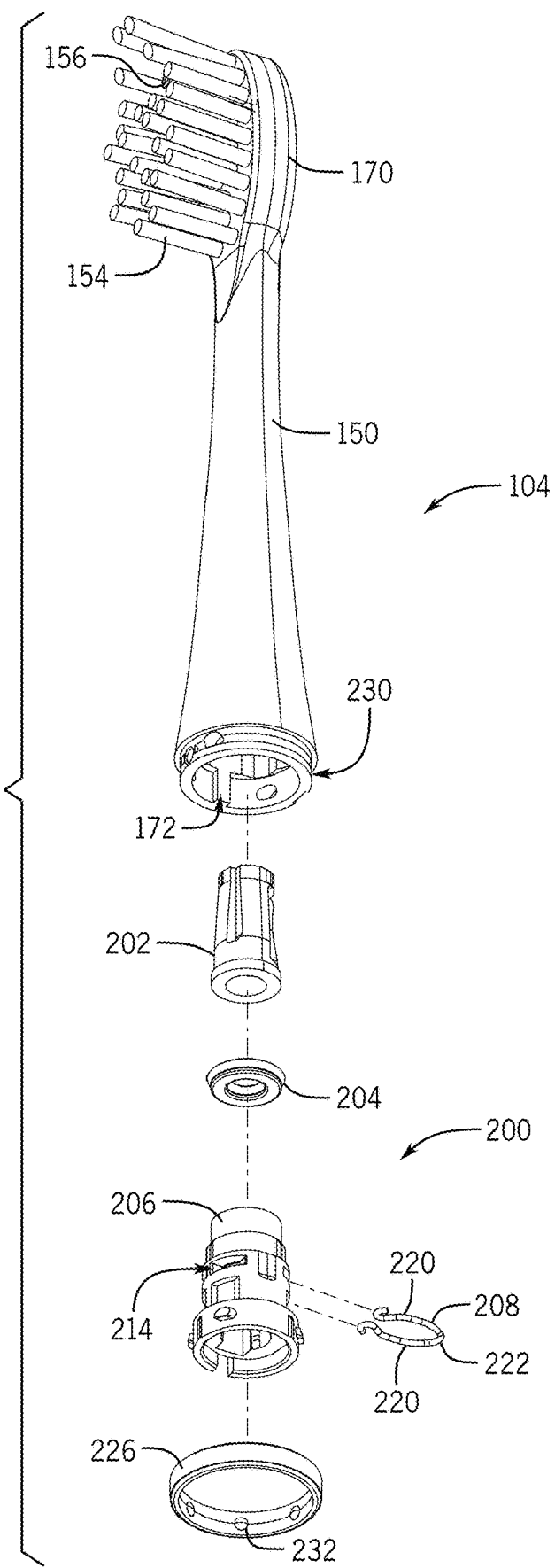

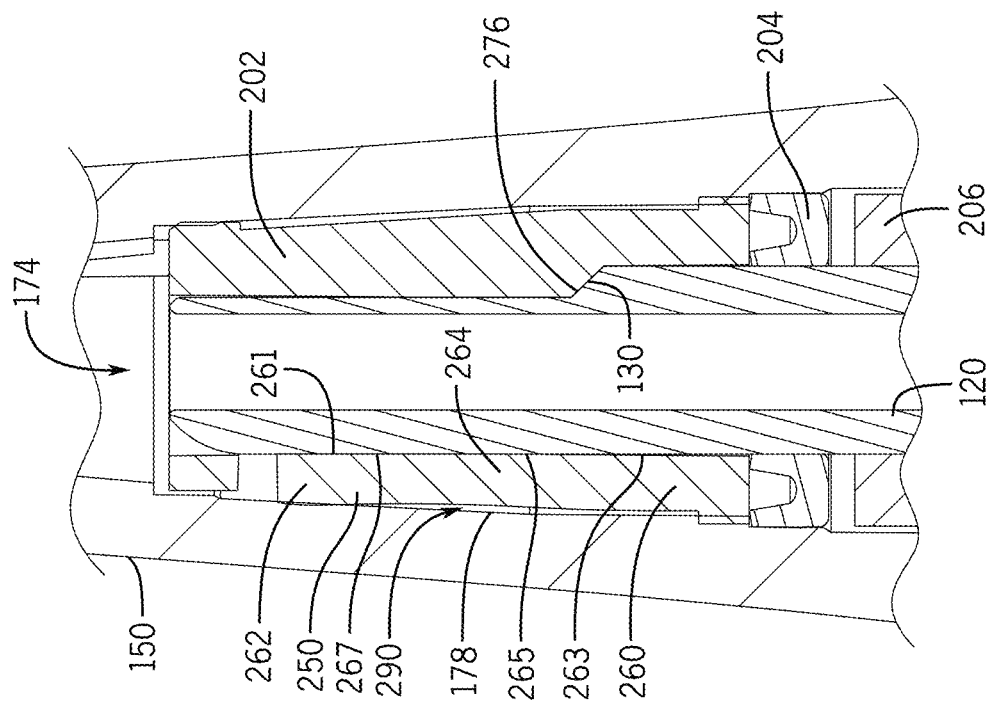
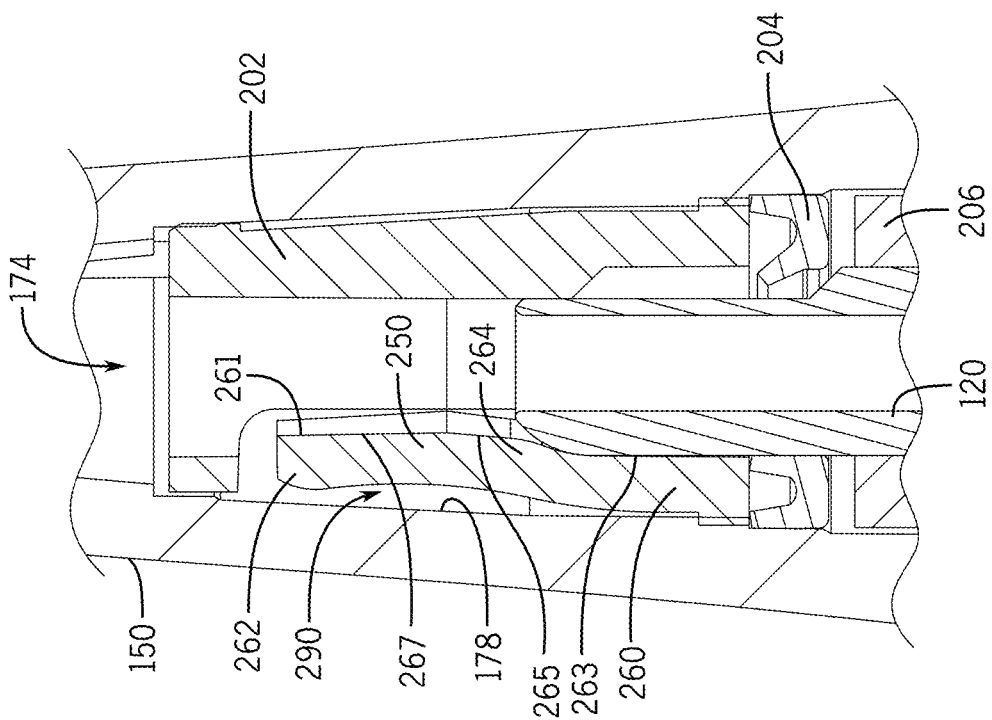

BRUSH HEAD FOR AN ORAL CLEANSING DEVICE

TECHNICAL FIELD

One or more embodiments of the present disclosure relate generally to oral cleansing devices and more particularly, for example, to systems and methods for a removable brush head of an oral cleansing device.

BACKGROUND

Electric toothbrushes and/or combination units that provide a toothbrush function along with an irrigating function sometimes include a cleaning attachment removably connected to a drive system. The connection between the cleaning attachment and the drive system can break or wear out, such as due to repeated attachment and removal of the cleaning attachment to and from the drive system. This breakdown or wearing out of the connection between the cleaning attachment and the drive system may cause performance degradation over time. For example, the connection may lose its friction fit tolerances, leading to inefficient transfer of rotational motion of the drive system to the brush head.

Therefore, there is a need in the art for systems and methods for a removable brush head of an oral cleansing device that addresses the deficiencies noted above, other deficiencies known in the industry, or at least offers an alternative to current techniques.

SUMMARY

According to one or more embodiments of the present disclosure, a brush head for an oral cleansing device, such as an electric toothbrush, is provided. The brush head may include a shaft and a cantilevered beam positioned within the shaft. The cantilevered beam may be configured to press against a drive shaft of the oral cleansing device to transfer motion of the drive shaft to the brush head.

According to one or more embodiments of the present disclosure, a brush head for an oral cleansing device is provided. The brush head may include a shaft and an adapter received within the shaft. The adapter may be configured to couple the brush head to a drive shaft of the oral cleansing device. The adapter may include a cantilevered beam configured to engage the drive shaft of the oral cleansing device to transfer motion of the drive shaft to the brush head.

According to one or more embodiments of the present disclosure, a method is provided. The method may include inserting a drive shaft of an oral cleansing device into a shaft of a brush head. The method may include causing, in response to inserting the drive shaft into the shaft of the brush head, a cantilevered beam inside the shaft to bend outward, creating a reactionary force that presses against the drive shaft.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the brush head described herein and should not be construed as a complete depiction of the scope of the brush head.

FIG. 3 illustrates a top, rear exploded view of the brush head of FIG. 2 in accordance with an embodiment of the disclosure.

FIG. 4 illustrates a bottom, front exploded view of the brush head of FIG. 2 in accordance with an embodiment of the disclosure.

FIG. 8A illustrates a fragmentary cross-sectional view of a brush head and showing a drive shaft partially inserted into a brush head adapter in accordance with an embodiment of the disclosure.

FIG. 8B illustrates a fragmentary cross-sectional view showing the drive shaft fully inserted into the brush head adapter in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

According to the present disclosure, a brush head is provided that improves coupling of the brush head to an oscillating drive shaft. Specifically, the brush head includes a cantilevered beam configured to press against the drive shaft and transfer rotational (e.g., oscillatory) motion of the drive shaft to the brush head. The cantilevered beam may press a flat portion of the drive shaft against a corresponding flat surface of the brush head to couple the brush head to the drive shaft. During insertion of the drive shaft within the brush head, the drive shaft may contact an intermediate portion of the cantilevered beam, causing the cantilevered beam to flex outward until a free end of the cantilevered beam contacts an interior surface or wall of the brush head. Continued flexing of the intermediate portion of the cantilevered beam towards the interior surface or wall of the brush head may cause an increasing force applied against the drive shaft to ensure coupling of the brush head to the drive shaft to transfer rotational (e.g., oscillatory) motion of the drive shaft to the brush head.

Figure 1:
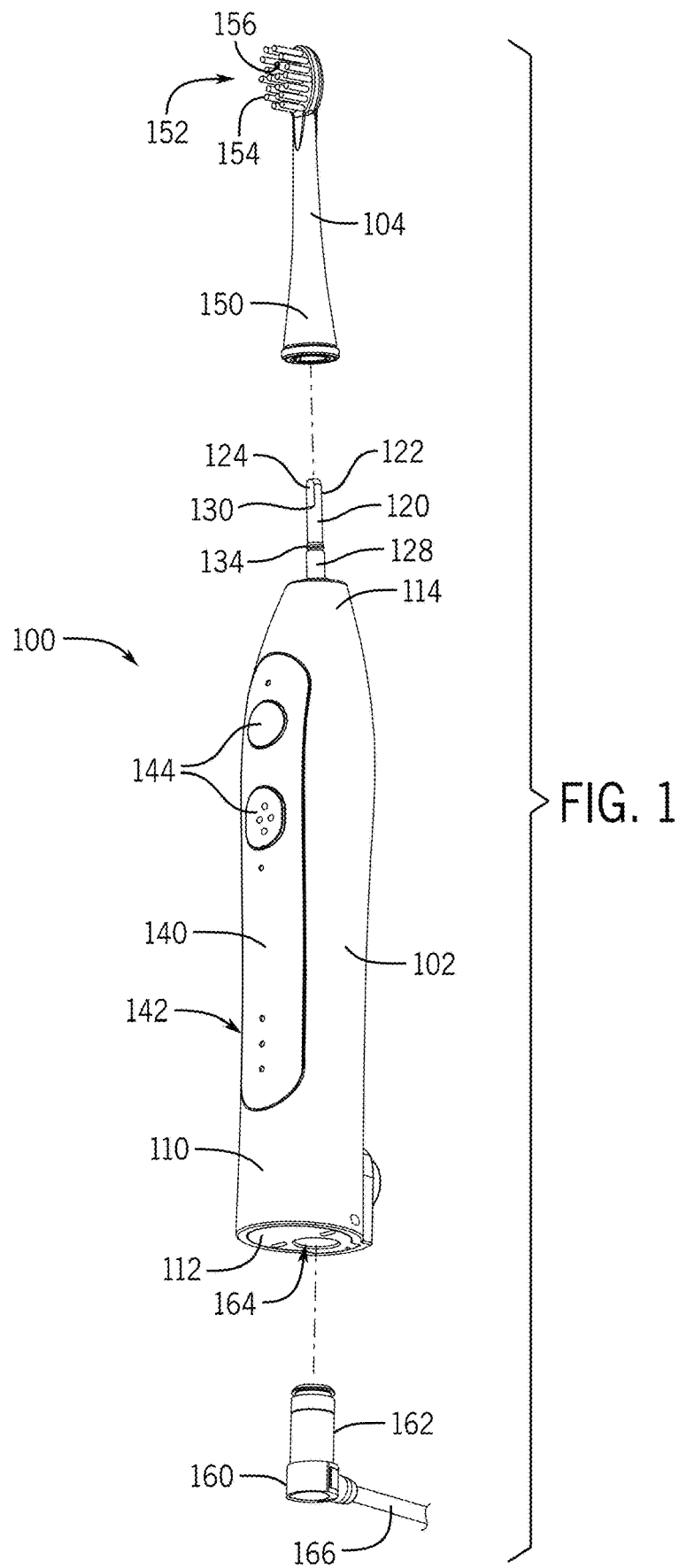
FIG. 1 illustrates an isometric, partially exploded view of an oral cleansing device in accordance with an embodiment of the disclosure.

FIG. 1 illustrates an isometric, partially exploded view of an oral cleansing device 100 in accordance with an embodiment of the disclosure. The oral cleansing device 100 may include many configurations. For example, the oral cleansing device 100 may be in the form of a handheld device and include a handle 102 and a brush head 104. Depending on the application, the oral cleansing device 100 may be a toothbrush, an oral irrigator, a combination of a toothbrush and an oral irrigator, or any other handheld device designed for oral care. For example, in the embodiment illustrated in FIG. 1, the oral cleansing device 100 is an irrigating toothbrush having both a brushing function and an irrigating function. In other embodiments, however, the oral cleansing device 100 may be an electric toothbrush, a handheld oral irrigator, or other device with a cleaning attachment. In such embodiments, "brush head" may refer to any cleaning attachment that is securable to the handle 102 without intent to limit.

The handle 102 may include many configurations. For example, the handle 102 may be defined by a housing 110 that extends between a base end 112 and a brush end 114. The housing 110 may be generally cylindrical in shape to ergonomically fit in the hand of a user, although the housing 110 may be formed in any other desirable ergonomic shape. In some embodiments, the cylindrical shape of the housing 110 may taper in the direction of the brush end 114 to define a smooth transition or taper to the brush head 104. The base end 112 of the housing 110 may be generally flat such that the handle 102 may be stood upright on a level surface.

As shown, the handle 102 may include a drive shaft 120 extending from the brush end 114 of the housing 110 to drive operation of the brush head 104. For example, the drive shaft 120 may oscillate to cause corresponding oscillation of the brush head 104, as detailed more fully below. In such embodiments, the oral cleansing device 100 may include a power train assembly coupled to the drive shaft 120. The power train assembly may include many configurations operable to oscillate the drive shaft 120 and the brush head 104 connected thereto. An example of a power train assembly that may drive the drive shaft 120 is shown and described in U.S. Pat. No. 10,449,023 entitled "Oral Cleansing Device with Energy Conservation," which is incorporated herein in its entirety for all purposes.

The drive shaft 120 may include one or more features facilitating attachment of the brush head 104 to the drive shaft 120. For example, the drive shaft 120 may include a tip 122 with a flat 124 defined thereon. In such embodiments, the tip 122 may include a non-circular cross-sectional shape that mates, at least partially, with a correspondingly-shaped structure of the brush head 104 to couple the brush head 104 to the drive shaft 120, as explained below. The drive shaft 120 may include a base 128 having a circular or substantially circular cross-section. In such embodiments, a shoulder 130 may be defined at a transition between the non-circular cross-sectional shape of the tip 122 and the circular cross-sectional shape of the base 128. In some embodiments, the drive shaft 120 may include a groove 134 defined circumferentially around its base 128 to axially couple the brush head 104 to the drive shaft 120, as detailed below.

In some embodiments, the handle 102 may include a faceplate 140 supported on the housing 110. Depending on the application, the faceplate 140 may be either a separate plate or an overmolded surface on the housing 110. The faceplate 140 may expose one or more status indicators 142 for indicating a mode or status of operation of the oral cleansing device 100. The status indicators 142 may be one or more light emitting diodes or the like. Example status indications may include low battery, charging, and fully charged battery. Example modes of operation may include low speed, high speed, and water flosser modes.

The handle 102 may include one or more control buttons 144 that control (e.g., selectively activate and deactivate) one or more functions and/or modes of the oral cleansing device 100. For example, the one or more control buttons 144 may control a brushing function and/or an irrigating function of the oral cleansing device 100. For instance, the one or more control buttons 144 may selectively activate and deactivate an oscillation of the brush head 104 associated with a brushing function of the oral cleansing device 100. In some embodiments, the one or more control buttons 144 may selectively control a water pressure and/or a pulse length of an irrigating function of the brush head 104. The number and function control of the control buttons 144 may be varied based on a desired functionality of the oral cleansing device 100. As shown, the control buttons 144 may be connected to the handle 102 or any other convenient location for the user. For example, the one or more control buttons 144 may be located within the faceplate 140 supported on the housing 110.

The brush head 104 may include many configurations to provide a brushing function and/or an irrigating function of the oral cleansing device 100. Unless otherwise provided, the brush head 104 may be similar to the brush assembly shown and described in U.S. Pat. No. 10,449,023. For instance, the brush head 104 may include shaft 150 and one or more cleaning elements 152. Depending on the application, the one or more cleaning elements 152 may include a plurality of bristles 154 and/or a nozzle 156. As shown, the nozzle 156 may be embedded in the bristles 154, such as extending amongst the bristles 154 (e.g., within a center region or field of the bristles 154). As described herein, the brush head 104 is removably connected to the handle 102. For instance, the shaft 150 of the brush head 104 may be removably connected to the drive shaft 120 of the handle 102, as noted above and described below. The removability of the brush head 104 may provide many benefits. For instance, the removability of the brush head 104 may allow a user to replace the brush head 104 as desired, such as when the brush head 104 reaches its useful end of life, is damaged, or is contaminated, among others. In addition, the removability of the brush head 104 may allow multiple users to hygienically use the same handle 102, with each user attaching a respective brush head 104 to the handle 102 for separate use.

In embodiments where the oral cleansing device 100 includes an irrigating function, the oral cleansing device 100 may include a fluid connector 160 for connecting the handle 102 to a fluid source. Depending on the application, the fluid connector 160 may be removably connected to the handle 102 or may be fixed to the handle 102. For example, the fluid connector 160 may be removable from the handle 102 to allow the oral cleansing device 100 to be operated without a fluid source (e.g., in a brush only mode) and/or allow easier storage and traveling. In such embodiments, the fluid connector 160 may include a tip 162 that is releasably inserted within an aperture 164 of the handle 102, such as defined within the base end 112 of the housing 110. In some embodiments, the fluid connector 160 may be rotationally coupled to the handle 102 such that the fluid connector 160 may rotate about an axis relative to the handle 102. The fluid connector 160 may be similar to the fluid connector shown and described in U.S. Pat. No. 10,449,023.

The fluid connector 160 may be in fluid communication with a reservoir and/or pumping system, such as via a hose 166, for pumping fluid through the oral cleansing device 100. An example of a pumping system that may be fluidically connected to the fluid connector 160 is shown and described in U.S. Pat. No. 8,641,649 entitled "Pump for Dental Water Jet," which is incorporated herein in its entirety for all purposes. In some embodiments, the fluid connector 160 may be connected directly to a pressurized water source, such as a faucet or J-pipe.

Figure 2:
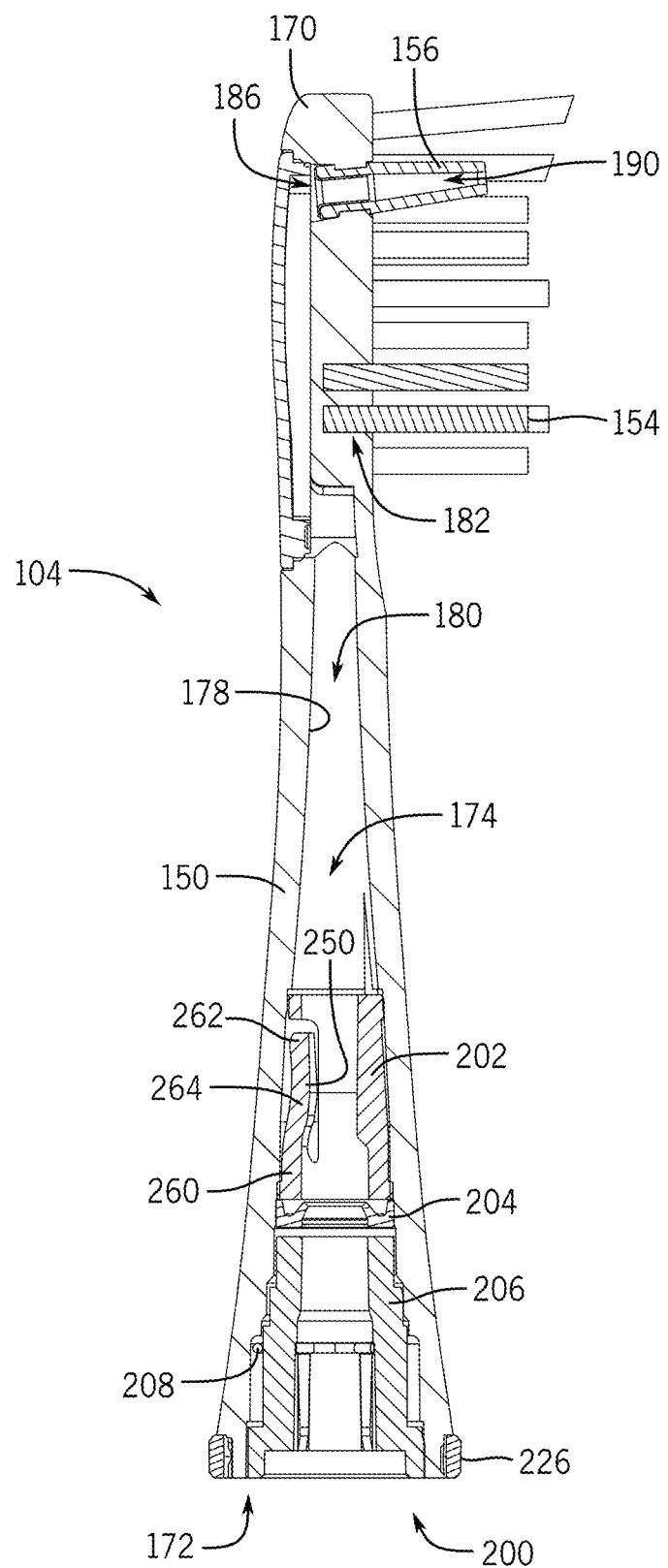
FIG. 2 illustrates a cross-sectional view of a brush head in accordance with an embodiment of the disclosure.

FIG. 2 illustrates a cross-sectional view of the brush head 104 in accordance with an embodiment of the disclosure. FIG. 3 illustrates a top, rear exploded view of the brush head 104 in accordance with an embodiment of the disclosure. FIG. 4 illustrates a bottom, front exploded view of the brush head 104 in accordance with an embodiment of the disclosure. Referring to FIGS. 2-4, the shaft 150 of the brush head 104 includes a bristle base 170 and a drive shaft opening 172. As shown in FIG. 2, a fluid passage 174 may be defined through the shaft 150 from the drive shaft opening 172 to the bristle base 170. For example, the shaft 150 may include an interior surface 178 defining an interior cavity 180 that defines, at least partially, the fluid passage 174 through the shaft 150. The bristles 154 may be secured to the bristle base 170. For example, the bristle base 170 may include a plurality of recesses 182 into which the bristles 154 are inserted and secured in place.

In some embodiments, the bristle base 170 may include a nozzle aperture 186 in fluid communication with the fluid passage 174. The nozzle aperture 186 may be open in an area surrounded by the bristles 154. The nozzle 156 may be positioned within the nozzle aperture 186. Depending on the application, the nozzle 156 may extend from the bristle base 170 approximately the same distance as the bristles 154. The nozzle 156 may include many configurations. For instance, the nozzle 156 may be elastomeric and include a fluid lumen 190 in fluid communication with the fluid passage 174 of the shaft 150. In this manner, fluid may pass through the fluid passage 174 of the shaft 150 and exit through the fluid lumen 190 of the nozzle 156 to provide an irrigating function of the brush head 104. In some embodiments, the nozzle 156 may be generally conical and taper in diameter from its base to its tip.

Referring to FIGS. 2-4, the brush head 104 may include an attachment assembly 200 configured to couple the brush head 104 to the handle 102. The attachment assembly 200 may include one or more components that attach and seal the brush head 104 to the drive shaft 120 of the handle 102. For example, the attachment assembly 200 may include an adapter 202, a sealing element 204, an end cap 206, and a retainer clip 208 that couple and seal the drive shaft 120 to the brush head 104. Each of the adapter 202, sealing element 204, end cap 206, and retainer clip 208 may be secured within the interior cavity 180 of the shaft 150. For instance, the adapter 202 may be inserted into and affixed within the fluid passage 174 via the drive shaft opening 172 of the shaft 150. The sealing element 204 may be inserted into the fluid passage 174 after the adapter 202, and the end cap 206 may be inserted into and affixed within the fluid passage 174 to hold the sealing element 204 in place against the adapter 202. Depending on the application, the sealing element 204 may be a U-cup seal, although other configurations are contemplated. Each of the adapter 202, sealing element 204, and end cap 206 may define a lumen through which the drive shaft 120 is at least partially inserted when the brush head 104 is connected to the handle 102. For instance, when the brush head 104 is connected to the handle 102, the drive shaft 120 may pass at least partially through the end cap 206, sealing element 204, and adapter 202. In such embodiments, the drive shaft 120 may be in fluid communication with the fluid passage 174 of the shaft 150 such that fluid pumped through the handle 102 exits the drive shaft 120 and into the fluid passage 174 of the brush head 104.

The end cap 206 may include one or more clip slots 214 to receive the retainer clip 208. For example, the end cap 206 may include a plurality of clip slots 214 configured to retain the retainer clip 208 therein to secure the drive shaft 120 to brush head 104. The retainer clip 208 may be formed from wire and may include a pair of clip arms 220 that oppose each other and are joined at a clip arch 222. The free ends of the clip arms 220 may each form a reverse curve that opens away from the other. When the retainer clip 208 is installed in the clip slots 214 of the end cap 206, the clip arch 222 may extend external to the end cap 206 on a first side, a middle portion of each clip arm may extend within one or more of the clip slots 214 and at least partially internal to the end cap 206 from the first side to an opposing second side of the end cap 206, and the free ends of the clip arms 220 may extend external to the end cap 206 on the second side. In such embodiments, the middle portions of the clip arms 220 may engage the groove 134 defined in the drive shaft 120 to retain the brush head 104 to the drive shaft 120, as detailed more fully below.

The brush head 104 may include other features for convenience. For example, the brush head 104 may include a trim ring 226 attached to the shaft 150 adjacent to the drive shaft opening 172. The trim ring 226 may allow for multiple users of the oral cleansing device 100 to easily identify their personal brush head 104 for attachment to the handle 102. For instance, the trim ring 226 may be various colors to associate a brush head 104 to a user. As shown in FIGS. 3 and 4, the base of the shaft 150 may define a retention groove 230. The inner wall of the trim ring 226 may define one or more retention detents 232 configured to snap into the retention groove 230 to retain the trim ring 226 around the base of the shaft 150.

Figure 6:
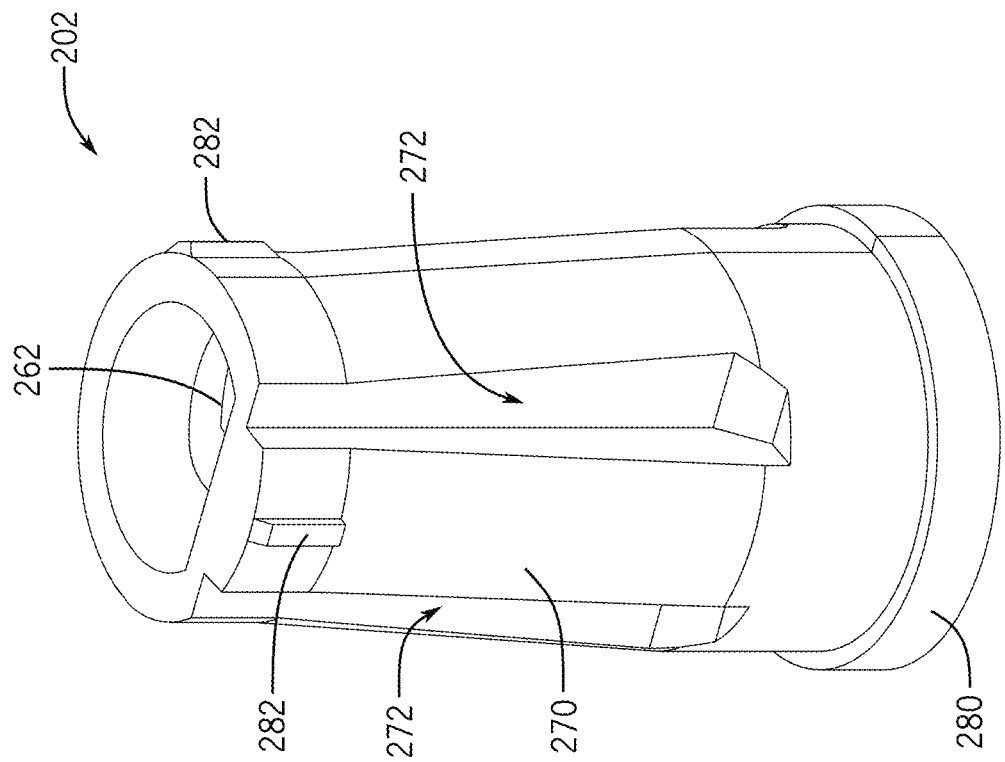
FIG. 6 illustrates another perspective view of the brush head adapter of FIG. 5 in accordance with an embodiment of the disclosure.
Figure 5:
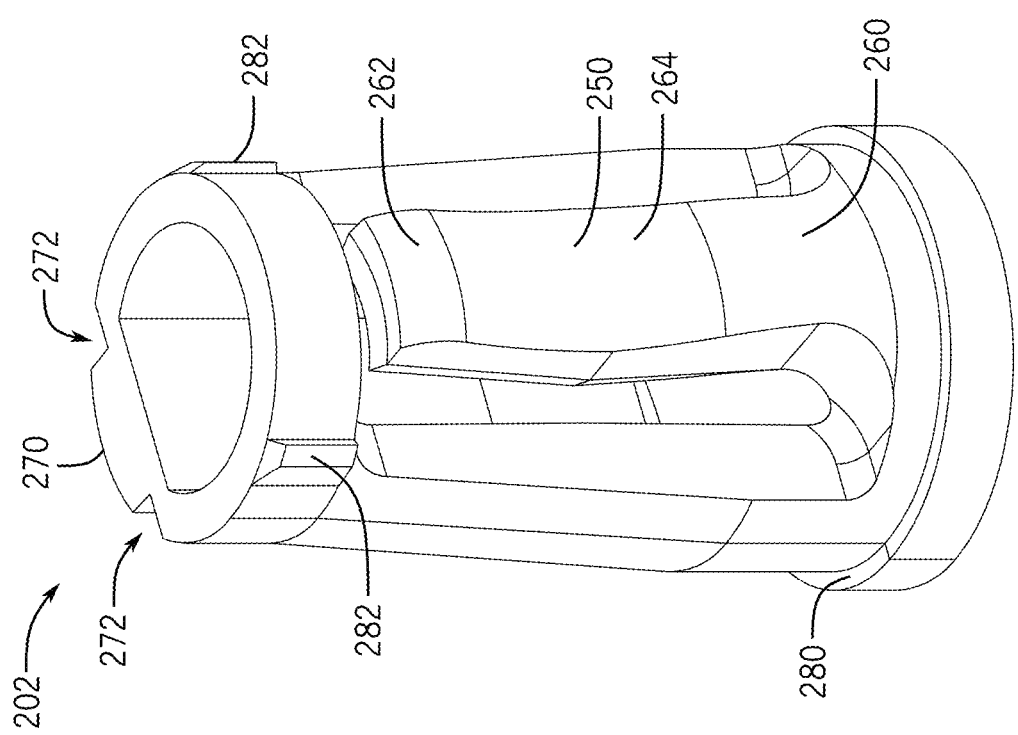
FIG. 5 illustrates a perspective view of a brush head adapter in accordance with an embodiment of the disclosure.
Figure 7:
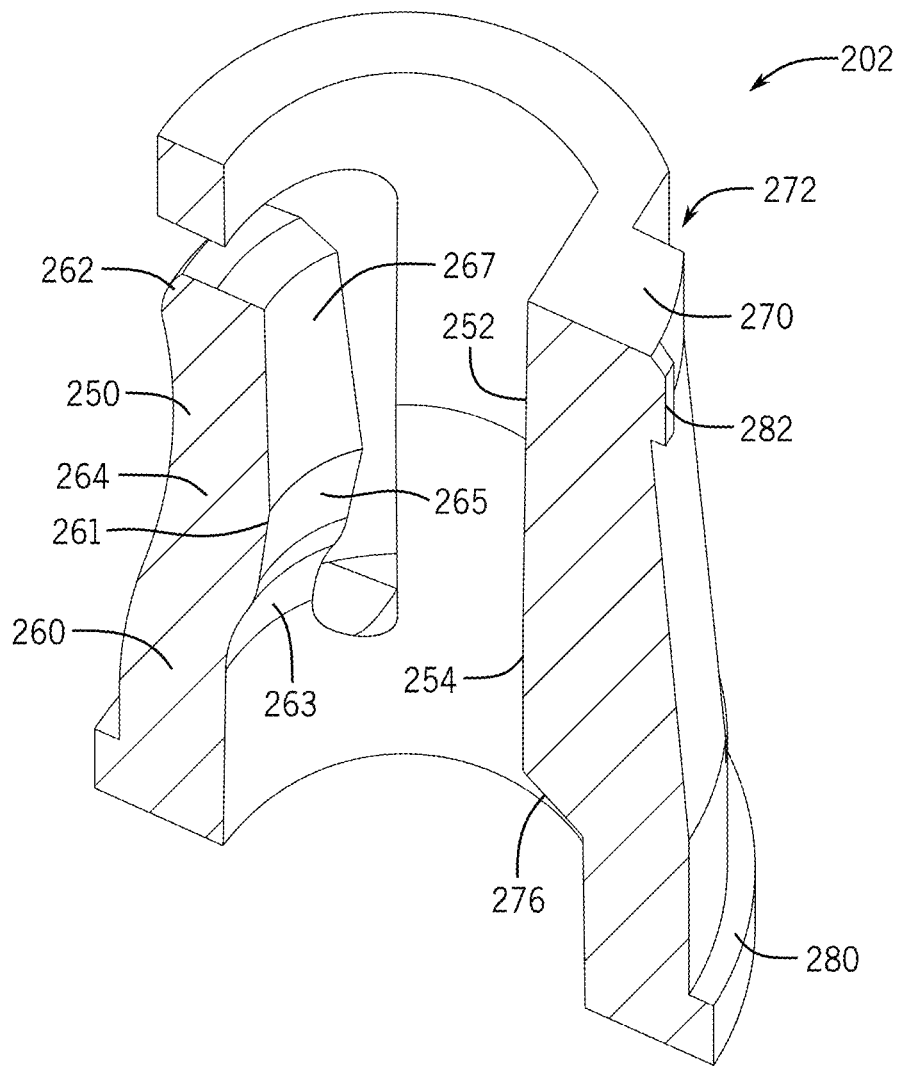
FIG. 7 illustrates a cross-sectional view of the brush head adapter of FIG. 5 in accordance with an embodiment of the disclosure.

FIG. 5 illustrates a perspective view of the adapter 202 in accordance with an embodiment of the disclosure. FIG. 6 illustrates another perspective view of the adapter 202 in accordance with an embodiment of the disclosure. FIG. 7 illustrates a cross-sectional view of the adapter 202 in accordance with an embodiment of the disclosure. Referring to FIGS. 5-7, the adapter 202, which may be referred to as a brush head adapter, may include various configurations to couple the brush head 104 to the drive shaft 120 of the oral cleansing device 100. As described herein, the adapter 202 is configured to couple the brush head 104 to the drive shaft 120. For example, the adapter 202 may include a cantilevered beam 250 configured to press against the drive shaft 120 of the oral cleansing device 100 to ensure the flat 124 on the drive shaft 120 remains in engagement with a corresponding surface of the brush head 104 to transfer a rotational (e.g., oscillatory) motion of the drive shaft 120 to the brush head 104. As best illustrated in FIG. 7, the adapter 202 includes an internal surface 252, which may be sized and shaped to engage the flat 124 of the drive shaft 120 such that rotational motion of the drive shaft 120 is transferred to the brush head 104. The surface 252 may be a planar surface and may be referred to as a flat 254. In such embodiments, the flat 124 of the drive shaft 120 may be in facing engagement with the flat 254 of the adapter 202 to transfer rotational motion of the drive shaft 120 to the adapter 202. The flat 254 of the adapter 202 may extend to a leading edge of the adapter 202. To ensure the surface 252 of the adapter 202 remains in engagement with the flat 124 of the drive shaft 120, the cantilevered beam 250 may engage an opposing side of the drive shaft 120, relative to the flat 124, to thereby press the flat 124 of the drive shaft 120 against the surface 252 of the adapter 202.

The cantilevered beam 250 may include a fixed end 260, an opposite free end 262, and an intermediate portion 264 between the fixed end 260 and the free end 262 configured to contact the drive shaft 120. The cantilevered beam 250 may resiliently flex, bend, or otherwise deform relative to the fixed end 260 as the brush head 104 is connected to the drive shaft 120. For instance, insertion of the drive shaft 120 within the adapter 202 may resiliently deform the cantilevered beam 250, such as causing the free end 262 of the cantilevered beam 250 to move relative to the fixed end 260 (e.g., laterally relative to the fixed end 260). As best illustrated in FIG. 7, the cantilevered beam 250 may include an inward curvature. The inward curvature may be defined by the intermediate portion 264 extending inward from the fixed end 260 towards the surface 252. The free end 262 may extend outward from the intermediate portion 264 away from the surface 252. As shown in FIGS. 5-7, the cantilevered beam 250 may extend lengthwise along a longitudinal direction of the adapter 202, such as lengthwise along a longitudinal direction of the shaft 150. As shown in FIG. 2, the fixed end 260 of the cantilevered beam 250 may be positioned proximate the drive shaft opening 172 of the shaft 150, and the free end 262 of the cantilevered beam 250 may be positioned distal the drive shaft opening 172.

Referring to FIGS. 7-8B, the cantilevered beam 250 may include an inner surface 261 that contacts the drive shaft 120 during insertion of the drive shaft 120 into the adapter 202. The inner surface 261 may include one or more segments that facilitate bending/flexing of the cantilevered beam 250 during insertion of the drive shaft 120 into the adapter 202. For example, as illustrated in FIG. 7, the inner surface 261 may include a first segment 263 that extends inward from the fixed end 260 of the beam 250. The first segment 263 may transition into a second segment 265 of the inner surface 261, and the second segment 265 may extend inward relative to the fixed end 260 of the beam 250 at a smaller angle or slope than the first segment 263. The second segment 265 may transition into a third segment 267 of the inner surface 261, and the third segment 267 may extend outward relative to the second segment 265. As illustrated in FIG. 8A, during insertion of the drive shaft 120 into the adapter 202, the drive shaft 120 initially contacts the first segment 263 of the inner surface 261 of the cantilevered beam 250, causing the beam 250 to bend outward about its fixed end 260 substantially as a rigid body. Because the beam 250 is bending substantially as a rigid body, the insertion force required to insert the drive shaft 120 into the adapter 202 is relatively low.

The length and angle or slope of the first segment 263 may be configured such that the drive shaft 120 contacts the second segment 265 of the inner surface 261 of the beam 250 substantially at the same time as the free end 262 of the beam 250 contacts the interior surface 178 of the shaft 150. After the free end 262 of the beam 250 contacts the interior surface 178 of the shaft 150, further insertion of the drive shaft 120 into the adapter 202 causes the intermediate portion 264 of the beam 250 to bend outward, in turn causing the free end 262 of the beam 250 to slide in a longitudinal direction along the interior surface 178 of the shaft 150. The bending of the intermediate portion 264 of the beam 250 may require a larger insertion force of the drive shaft 120 into the adapter 202. As previously mentioned, the second segment 265 may have a smaller angle or slope than the first segment 263 of the inner surface 261 of the beam 250, thereby reducing the insertion force required to insert the drive shaft 120 into the adapter 202 during this second phase of drive shaft insertion. As the drive shaft 120 is continued to be inserted into the adapter 202, the drive shaft 120 contacts the third segment 267 of the inner surface 261 of the cantilevered beam 250. As previously mentioned, the third segment 267 may extend outward relative to the second segment 265, and thus the insertion force required to insert the drive shaft 120 into the adapter 202 may be reduced as the drive shaft 120 contacts the third segment 267. As illustrated in FIG. 8B, when the drive shaft 120 is fully inserted into the adapter 202, the cantilevered beam 250 may be extend substantially rectilinear.

With continued reference to FIGS. 5-7, the adapter 202 may include other features. For example, the adapter 202 may include one or more alignment features to align the adapter 202 within the shaft 150. The alignment features may be positioned opposite of the cantilevered beam 250. In the embodiments illustrated in FIGS. 5-7, the alignment features may include an alignment rib 270, which may be defined by a pair of alignment notches 272 defined in the exterior surface of the adapter 202. In such embodiments, the alignment rib 270 and alignment notches 272 may mate with corresponding features of the shaft 150 to properly align the adapter 202 within the shaft 150.

In some embodiments, the adapter 202 may include one or more features that indicate full insertion of the drive shaft 120 into the adapter 202, or vice versa. For instance, as shown in FIG. 7, the adapter 202 may include a shoulder 276 (e.g., a ramp or angled surface) extending from the flat 254 of the adapter 202. The shoulder 276 may engage a portion of the drive shaft 120 to define a fully inserted position of the brush head 104 on the drive shaft 120. For example, the shoulder 276 may be configured to engage the shoulder 130 of the drive shaft 120 to define the fully inserted position of the brush head 104 on the drive shaft 120.

In some embodiments, the adapter 202 may include one or more securement features configured to secure (e.g., fix) the adapter 202 to the interior surface 178 of the shaft 150. For instance, the base of the adapter 202 may include a flange 280 that seats into the shaft 150. Additionally, or alternatively, the adapter 202 may include one or more outwardly extending posts 282 that seat into the interior surface 178 of the shaft 150. The flange 280 and the posts 282 may secure the adapter 202 to the interior surface 178 of the shaft 150 through an interference fit, sonic welding, or a combination thereof. For instance, during or after insertion of the adapter 202 into the shaft 150, the adapter 202 may be sonic or friction welded to the shaft 150 such that the flange 280 and/or posts 282 at least partially melt to the interior surface 178 of the shaft 150 to secure the components together. The adapter 202 may be attached to the shaft 150 in various manners.

FIG. 8A illustrates a fragmentary cross-sectional view of the brush head 104 and showing the drive shaft 120 partially inserted into the adapter 202 in accordance with an embodiment of the disclosure. FIG. 8B illustrates a fragmentary cross-sectional view showing the drive shaft 120 fully inserted into the adapter 202 in accordance with an embodiment of the disclosure. Referring to FIGS. 8A and 8B, insertion of the drive shaft 120 into the brush head 104 will now be described in detail. Referring to FIG. 8A, the brush head 104 may be inserted onto the drive shaft 120 of the handle 102 until the drive shaft 120 engages the adapter 202. During insertion of the drive shaft 120 into the adapter 202, the drive shaft 120 contacts the intermediate portion 264 of the cantilevered beam 250, causing the cantilevered beam 250 to flex and move outward. For example, contact of the drive shaft 120 with the intermediate portion 264 of the cantilevered beam 250 may cause the cantilevered beam 250 to flex outward towards the interior surface 178 of the shaft 150. In such embodiments, a gap 290 may be defined between the intermediate portion 264 of the cantilevered beam 250 and the interior surface 178 of the shaft 150, the gap 290 providing clearance for outward flexing of the cantilevered beam 250 during insertion of the drive shaft 120 into the adapter 202.

Referring to FIG. 8B, outward flexing of the cantilevered beam 250 during insertion of the drive shaft 120 into the adapter 202 may cause the free end 262 of the cantilevered beam 250 to engage a second portion of the brush head 104. For instance, the free end 262 of the cantilevered beam 250 may engage the interior surface 178 of the shaft 150 when the drive shaft 120 is further inserted into the adapter 202. As the free end 262 engages the interior surface 178 of the shaft 150, the intermediate portion 264 of the cantilevered beam 250 flexes or bends towards the interior surface 178 of the shaft 150, reducing the gap 290 between the intermediate portion 264 and the interior surface 178. This outward flexing of the cantilevered beam 250 may create a counter or reactionary force on the drive shaft 120 that grips the drive shaft 120 to transfer rotational (e.g., oscillatory) motion of the drive shaft 120 to the brush head 104. Because the free end 262 is unsupported, the free end 262 may slide or otherwise move along the interior surface 178 of the shaft 150, such as defining a sliding contact point with the interior surface 178.

Such configurations may reduce the stresses in the cantilevered beam 250 compared to other designs in which the beam is rigidly supported on both ends. For example, the cantilevered arrangement of the cantilevered beam 250 may reduce or eliminate tension and/or compression loads within the beam. In some embodiments, the cantilevered arrangement of the cantilevered beam 250 may apply only bending loads within the beam. Compared to other designs in which the beam is rigidly supported on both ends, the cantilevered arrangement may allow higher forces to be applied to the drive shaft 120 (e.g., to push the flats 124, 254 together) and/or may accommodate larger part dimensional tolerances.

In some embodiments, the force may press the drive shaft 120 against the surface 252 of the adapter 202 to grip the adapter 202 to the drive shaft 120. In some embodiments, the flat 124 of the drive shaft 120 may be pressed against the flat 254 of the adapter 202. For example, when the brush head 104 is connected to the drive shaft 120, the cantilevered beam 250 may press the flat 124 of the drive shaft 120 against the opposing flat 254 of the adapter 202 such that rotational (e.g., oscillatory) motion of the drive shaft 120 is transferred to the brush head 104. As shown in FIG. 8B, the drive shaft 120 may be inserted into the adapter 202 until the shoulder 130 of the drive shaft 120 engages the shoulder 276 of the adapter 202, at which point the retainer clip 208 may be seated within the groove 134 of the drive shaft 120 to limit axial movement of the brush head 104 relative to the drive shaft 120.

The cantilevered beam 250 may be configured to grip the drive shaft 120 to transfer all or nearly all rotational (e.g., oscillatory) motion of the drive shaft 120 to the brush head 104, while also allowing for easy insertion and removal of the drive shaft 120 from the adapter 202. For example, as the cantilevered beam 250 outwardly flexes, the force applied to the drive shaft 120 by the cantilevered beam 250 increases, increasing the pressing action of the drive shaft 120 against the surface 252 of the adapter 202, until a maximum force against the drive shaft 120 is achieved after initial insertion of the drive shaft 120 into the adapter 202. The force applied to the drive shaft 120 may be concentrated midway or approximately midway between the fixed end 260 and the free end 262 of the cantilevered beam 250. The concentration of the force midway or approximately midway between the fixed end 260 and the free end 262 of the cantilevered beam 250 may be facilitated by the shape of the intermediate portion 264 itself, such as the intermediate portion 264 including a high point midway or approximately midway between the fixed end 260 and the free end 262 of the cantilevered beam 250 as defined at least partially by the inward curvature of the cantilevered beam 250. The shape of the intermediate portion 264 may also provide easy insertion of the drive shaft 120 into the adapter 202 and/or easy removal of the drive shaft 120 from the adapter 202. For instance, the shape of the intermediate portion 264 (e.g., the inward curvature of the cantilevered beam 250) may reduce the friction between the cantilevered beam 250 and the drive shaft 120 for easy insertion and removal of the drive shaft 120.

Figure 9:
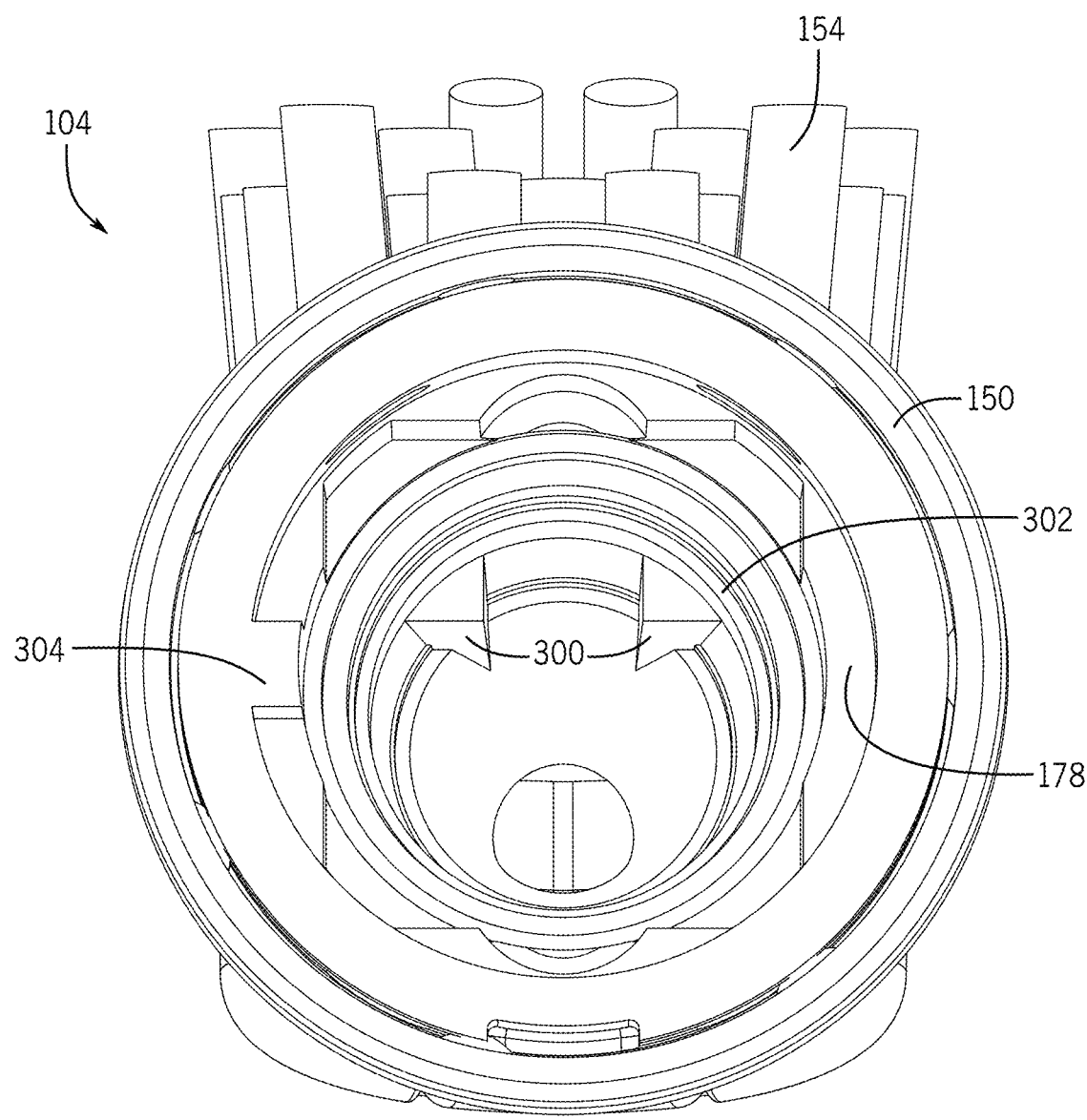
FIG. 9 illustrates a bottom view of a shaft of a brush head in accordance with an embodiment of the disclosure.

FIG. 9 illustrates a bottom view of the shaft 150 of the brush head 104 in accordance with an embodiment of the disclosure. As shown in FIG. 9, the interior surface 178 of the shaft 150 may include one or more features facilitating alignment of the attachment assembly 200 within the shaft 150. For instance, the shaft 150 may include a pair of alignment tabs 300 that fit within the alignment notches 272 of the adapter 202 to at least partially surround the alignment rib 270. The shaft 150 may also include a ledge 302 that engages the flange 280 of the adapter 202 to set the position (e.g., depth) of the adapter 202 within the shaft 150. The shaft 150 may also include an alignment bar 304 that nests within a portion of the end cap 206 to ensure alignment of the end cap 206 within the shaft 150.

Figure 10:
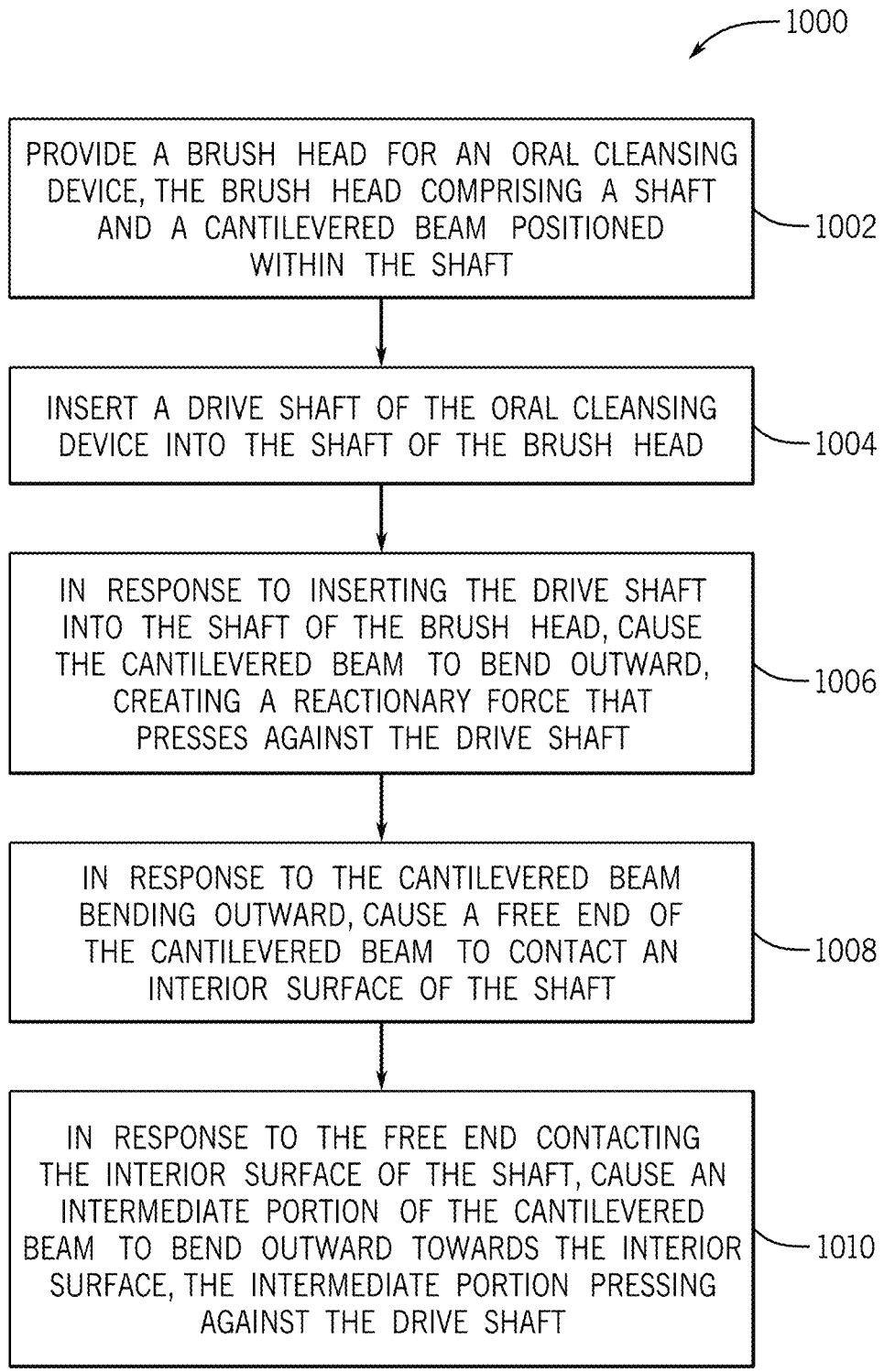
FIG. 10 illustrates a flow diagram of a process of attaching a brush head to a handle of an oral cleansing device in accordance with an embodiment of the disclosure.

FIG. 10 illustrates a flow diagram of a process 1000 of attaching a brush head to a handle of an oral cleansing device in accordance with an embodiment of the disclosure. It should be appreciated that any step, sub-step, sub-process, or block of process 1000 may be performed in an order or arrangement different from the embodiments illustrated by FIG. 10. For example, one or more blocks may be omitted from or added to the process 1000. Although process 1000 is described with reference to the embodiments of FIGS. 1-9, process 1000 may be applied to other embodiments.

In Block 1002, process 1000 includes providing a brush head for an oral cleansing device, the brush head including a shaft and a cantilevered beam positioned within the shaft. In some embodiments, the brush head may include an adapter positioned within the shaft to couple the brush head to at least a drive shaft of the oral cleansing device. The adapter may include the cantilevered beam and a first flat configured to mate with the drive shaft. The oral cleansing device, brush head, shaft, cantilevered beam, and adapter may be similar to the oral cleansing device 100, brush head 104, shaft 150, cantilevered beam 250, and adapter 202 of FIGS. 1-9, described above.

In Block 1004, process 1000 includes inserting a drive shaft of the oral cleansing device within the shaft of the brush head. For instance, the drive shaft may be inserted within the adapter positioned within the shaft, such as in a manner described above. In Block 1006, process 1000 includes causing, in response to inserting the drive shaft within the shaft of the brush head, the cantilevered beam to bend outward, creating a force pressing the drive shaft against a portion of the brush head. In some embodiments, the force created in response to inserting the drive shaft within the brush head may press a flat of the drive shaft against a flat of the adapter to transfer a rotational (e.g., oscillatory) motion of the drive shaft to the brush head. In some embodiments, the force may be concentrated midway or approximately midway between a fixed end of the cantilevered beam and a free end of the cantilevered beam.

In Block 1008, process 1000 may include causing, in response to the cantilevered beam bending outward, a free end of the cantilevered beam to contact an interior surface of the shaft. For example, insertion of the drive shaft within the brush head may cause the drive shaft to contact an inwardly bending intermediate portion of the cantilevered beam, causing the cantilevered beam to flex and move the free end of the cantilevered beam outward until the free end contacts the interior surface of the shaft, such as in a manner described above.

In Block 1010, process 1000 may include causing, in response to the free end of the cantilevered beam contacting the interior surface of the shaft, an intermediate portion of the cantilevered beam to flex outward towards the interior surface, the intermediate portion pressing the drive shaft against the portion of the brush head. For example, the intermediate portion may outwardly flex within a gap defined between the intermediate portion of the cantilevered beam and the interior surface of the shaft, as described above. The outward flexing of the intermediate portion may create a counter or reactionary force on the drive shaft that grips the drive shaft to transfer rotational (e.g., oscillatory) motion of the drive shaft to the brush head.

All relative and directional references (including top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A brush head for an oral cleansing device, the brush head comprising:
    a shaft including an interior surface defining an interior cavity; and
    an adapter received within the shaft and configured to couple the brush head to a drive shaft of the oral cleansing device, wherein the adapter includes a cantilevered beam configured to engage the drive shaft of the oral cleansing device to transfer a rotational motion of the drive shaft to the brush head;
    wherein the cantilevered beam includes a fixed end supported by the adapter, an opposite free end, and an intermediate portion between the fixed end and the free end;
    wherein a gap is defined between the intermediate portion of the cantilevered beam and the interior surface of the shaft, the gap providing clearance for outward flexing of the cantilevered beam during insertion of the drive shaft into the adapter; and
    wherein outward flexing of the cantilevered beam causes the free end of the cantilevered beam to contact the interior surface of the shaft before bending of the intermediate portion of the cantilevered beam.

2. The brush head of claim 1,
    wherein contact of the drive shaft with the intermediate portion of the cantilevered beam causes the free end to engage the shaft.

3. The brush head of claim 1, wherein the cantilevered beam comprises an inward curvature defined by the intermediate portion extending inward from the fixed end and the free end extending outward from the intermediate portion.

4. The brush head of claim 1, wherein:
    the fixed end of the cantilevered beam is positioned proximate a drive shaft opening of the shaft; and
    the free end of the cantilevered beam is positioned distal the drive shaft opening.

5. The brush head of claim 1, wherein a base of the adapter includes a flange, and the fixed end of the cantilevered beam is positioned proximate the flange.

6. The brush head of claim 1, wherein the adapter further includes one or more alignment features to align the adapter within the shaft.

7. The brush head of claim 6, wherein the one or more alignment features comprise an alignment rib defined by a pair of alignment notches defined in an exterior surface of the adapter.

8. The brush head of claim 1, wherein the cantilevered beam extends lengthwise along a longitudinal direction of the shaft.

9. The brush head of claim 1, wherein the cantilevered beam is configured such that after the free end of the cantilevered beam contacts the interior surface of the shaft, further insertion of the drive shaft into the adapter causes the intermediate portion of the cantilevered beam to bend outward, in turn causing the free end of the beam to slide in a longitudinal direction along the interior surface of the shaft.

10. The brush head of claim 1, wherein
contact of the drive shaft with the intermediate portion of the cantilevered beam causes the cantilevered beam to flex outward towards the interior surface of the shaft.

11. The brush head of claim 1, wherein the cantilevered beam is configured to apply a force to the drive shaft, the force concentrated midway between the fixed end and the free end.

12. The brush head of claim 1, further comprising a sealing element positioned between the adapter and a drive shaft opening of the shaft.

13. The brush head of claim 1, wherein:
the adapter and the drive shaft each include a respective flat; and
the cantilevered beam presses the flat of the drive shaft against the flat of the adapter such that motion of the drive shaft is transferred to the brush head.

14. The brush head of claim 13, wherein the flat of the adapter extends to a leading edge of the adapter.

15. The brush head of claim 13, wherein the adapter further includes a shoulder extending from the flat of the adapter to engage the drive shaft and define a fully inserted position of the brush head on the drive shaft.

16. The brush head of claim 1, wherein the outward flexing of the cantilevered beam comprises the cantilevered beam bending substantially as a rigid body.

17. The brush head of claim 1, wherein the adapter is sonically welded to the interior surface of the shaft.

18. The brush head of claim 1, wherein the cantilevered beam includes an interior surface with a first segment that extends inward at a first angle and transitions into a second segment that extends inward at a second angle that is less than the first angle.

19. The brush head of claim 18, wherein a length and the first angle of the first segment are configured such that the drive shaft contacts the second segment of the inner surface of the cantilevered beam substantially at the same time as the free end of the cantilevered beam contacts the interior surface of the shaft.

20. The brush head of claim 19, wherein the interior surface of the cantilevered beam further includes a third segment that extends outward relative to the second segment such that an insertion force required to insert the drive shaft into the adapter is reduced as the drive shaft contacts the third segment.

* * * * *